US012787110B2

(12) United States Patent
Salim et al.

(10) Patent No.: US 12,787,110 B2
(45) Date of Patent: Nov. 3, 2026

(54) DISCONTINUOUS RECEIVE MECHANISMS FOR SIDELINK DEVICES

(71) Applicant: Huizhou TCL Cloud Internet Corporation Technology Co., Ltd., Huizhou (CN)

(72) Inventors: Umer Salim, Huizhou (CN); Sebastian Wagner, Huizhou (CN); Pierre Bonnard, Huizhou (CN)

(73) Assignee: Huizhou TCL Cloud Internet Corporation Technology Co., Ltd., Huizhou (CN)

( * ) Notice: Subject to any disclaimer, the term of this patent is extended or adjusted under 35 U.S.C. 154(b) by 299 days.

(21) Appl. No.: 18/248,378

(22) PCT Filed: Oct. 8, 2021

(86) PCT No.: PCT/CN2021/122683
§ 371 (c)(1),
(2) Date: Apr. 7, 2023

(87) PCT Pub. No.: WO2022/073480
PCT Pub. Date: Apr. 14, 2022

(65) Prior Publication Data
US 2023/0397295 A1 Dec. 7, 2023

Related U.S. Application Data

(60) Provisional application No. 63/090,081, filed on Oct. 9, 2020.

(51) Int. Cl.
*H04W 76/28* (2018.01)

(52) U.S. Cl.
CPC .................................. *H04W 76/28* (2018.02)

(58) Field of Classification Search
None
See application file for complete search history.

(56) References Cited

U.S. PATENT DOCUMENTS

| | | | |
|---|---|---|---|
| 8,693,381 | B2 | 4/2014 | Zhang |
| 9,313,734 | B2 | 4/2016 | Jamadagni |
| 2019/0387572 | A1 | 12/2019 | Nam et al. |

(Continued)

FOREIGN PATENT DOCUMENTS

| | | | |
|---|---|---|---|
| CN | 101483446 | A | 7/2009 |
| CN | 102014441 | A | 4/2011 |

(Continued)

OTHER PUBLICATIONS

Written Opinion of the International Search Authority in international application No. PCT/CN2021/122683, mailed on Jan. 6, 2022.
International Search Report in International application No. PCT/CN2021/122683, mailed on Jan. 6, 2022.
European Search Report in European application No. 21876998.2, mailed on Nov. 15, 2024.

(Continued)

*Primary Examiner* — Walter J Divito
(74) *Attorney, Agent, or Firm* — PV IP PC; Wei Te Chung

(57) ABSTRACT

A method of configuring a UE operating in a cellular communications system for discontinuous reception includes the steps of receiving or configuring a plurality of discontinuous reception configurations at the UE, selecting at least one of the discontinuous reception configurations for use by the UE, and operating the UE according to the at least one selected discontinuous reception configuration.

18 Claims, 4 Drawing Sheets

(56) References Cited

U.S. PATENT DOCUMENTS

| | | | | |
|---|---|---|---|---|
| 2021/0051589 | A1* | 2/2021 | Nam | H04W 52/0235 |
| 2022/0022279 | A1* | 1/2022 | Kim | H04W 72/23 |

FOREIGN PATENT DOCUMENTS

| | | | |
|---|---|---|---|
| CN | 102413587 | A | 4/2012 |
| CN | 104125612 | A | 10/2014 |
| CN | 108616902 | A | 10/2018 |
| CN | 108712773 | A | 10/2018 |
| CN | 109479189 | A | 3/2019 |
| CN | 110945962 | A | 3/2020 |
| CN | 111556590 | A | 8/2020 |
| WO | 2018004541 | A1 | 1/2018 |
| WO | 2019/182287 | A1 | 9/2019 |

OTHER PUBLICATIONS

Chinese Office Action issued in corresponding Chinese Patent Application No. 202180069382.1 dated Dec. 30, 2025, pp. 1-10.

Chinese Office Action issued in corresponding Chinese Patent Application No. 202180069382.1 dated Aug. 21, 2026, pp. 1-11.

NPL1: Nokia et al.: "KI#1, new solution: PC5 DRX configuration for QoS-aware and power-efficient communication";3GPP SA WG2 Meeting #140e, S2-2006597;Sep. 2, 2020.

NPL2: Nokia et al.: "KI#1, Sol#2: Update to clarify PC5 DRX pattern information, PC5 DRX activation and deactivation, and AS-layer PC5 DRX adjustments"; 3GPP SA WG2 Meeting #141e,S2-2007597;Oct. 23, 2020.

* cited by examiner

DISCONTINUOUS RECEIVE MECHANISMS FOR SIDELINK DEVICES

CROSS REFERENCE TO RELATED APPLICATIONS

This application is a US national phase application based upon an International Application No. PCT/CN2021/122683, filed on Oct. 8, 2021, which claims priority to U.S. Provisional Patent Application No. 63/090,081, filed on Oct. 9, 2020, and entitled "Discontinuous reception for sidelink communications". The entire disclosures of the above application are incorporated herein by reference.

TECHNICAL FIELD

The following disclosure relates to discontinuous reception cellular networks, and in particular to discontinuous reception for sidelink communications.

BACKGROUND

Wireless communication systems, such as the third-generation (3G) of mobile telephone standards and technology are well known. Such 3G standards and technology have been developed by the Third Generation Partnership Project (3GPP)®. The 3rd generation of wireless communications has generally been developed to support macro-cell mobile phone communications. Communication systems and networks have developed towards a broadband and mobile system.

In cellular wireless communication systems User Equipment (UE) is connected by a wireless link to a Radio Access Network (RAN). The RAN comprises a set of base stations which provide wireless links to the UEs located in cells covered by the base station, and an interface to a Core Network (CN) which provides overall network control. As will be appreciated the RAN and CN each conduct respective functions in relation to the overall network. For convenience the term cellular network will be used to refer to the combined RAN & CN, and it will be understood that the term is used to refer to the respective system for performing the disclosed function.

The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a gNB. NR is proposed to utilise an Orthogonal Frequency Division Multiplexed (OFDM) physical transmission format.

The NR protocols are intended to offer options for operating in unlicensed radio bands, to be known as NR-U. When operating in an unlicensed radio band the gNB and UE must compete with other devices for physical medium/resource access. For example, Wi-Fi®, NR-U, and LAA may utilise the same physical resources.

A trend in wireless communications is towards the provision of lower latency and higher reliability services. For example, NR is intended to support Ultra-reliable and low-latency communications (URLLC) and massive Machine-Type Communications (mMTC) are intended to provide low latency and high reliability for small packet sizes (typically 32 bytes). A user-plane latency of 1 ms has been proposed with a reliability of 99.99999%, and at the physical layer a packet loss rate of $10^{-5}$ or 10 has been proposed.

mMTC services are intended to support a large number of devices over a long life-time with highly energy efficient communication channels, where transmission of data to and from each device occurs sporadically and infrequently. For example, a cell may be expected to support many thousands of devices.

The disclosure below relates to various improvements to cellular wireless communications systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The invention is defined by the appended claims in which there is required a method of configuring a UE operating in a cellular communications system for discontinuous reception, the method comprising the steps of defining a plurality of discontinuous reception configurations at the UE; selecting at least one of the discontinuous reception configurations for use by the UE; and operating the UE according to the at least one selected discontinuous reception configuration.

The step of selecting may be performed by a base station to which the UE is connected.

The UE may transmit an indication of a preferred discontinuous reception configuration to the base station prior to the base station selecting a discontinuous reception configuration for the UE.

The indication may be transmitted utilised RRC signalling.

The base station may indicate the selected configuration to the UE utilising RRC signalling.

The step of selecting may be performed by the UE.

The step of selecting may be performed by a further UE to which the UE is connected for sidelink communications.

The UE and/or the further UE may apply an offset to their selected discontinuous reception configuration to ensure at least a partial overlap between the on periods of each UE.

The UE and/or the further UE may select the same discontinuous reception configuration to ensure at least a partial overlap between the on periods of each UE.

The discontinuous reception configuration may be selected based on the bandwidth part allocated for the UE.

The discontinuous reception configuration may be selected based on the resource pool allocated for the UE.

The discontinuous reception configuration may be selected based on a cast type active for the UE.

The discontinuous reception configuration may be selected based on a characteristic of the UE.

The characteristic may be an identifier, category, or capability of the UE.

The characteristic may be a power state

The characteristic may be a communication requirement of the UE.

The communication requirement may be an urgency of data for transmission, or a quality of service parameter.

The plurality of discontinuous reception configurations may each define at least one of an on duration, a DRX cycle time, a DRX short cycle time, a DRX long cycle time and an offset.

The discontinuous reception configurations may be communicated to the UE utilising RRC signalling, or are defined by a standard.

One of the discontinuous reception configurations may be defined as a default configuration.

A first discontinuous reception configuration may be selected for sidelink communications by the UE and a second discontinuous reception configuration is selected for communications with a base station.

There is also provided a base station and at least UE configured to perform the method of any preceding claim.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION OF THE PREFERRED EMBODIMENTS

Those skilled in the art will recognise and appreciate that the specifics of the examples described are merely illustrative of some embodiments and that the teachings set forth herein are applicable in a variety of alternative settings.

Figure 1:
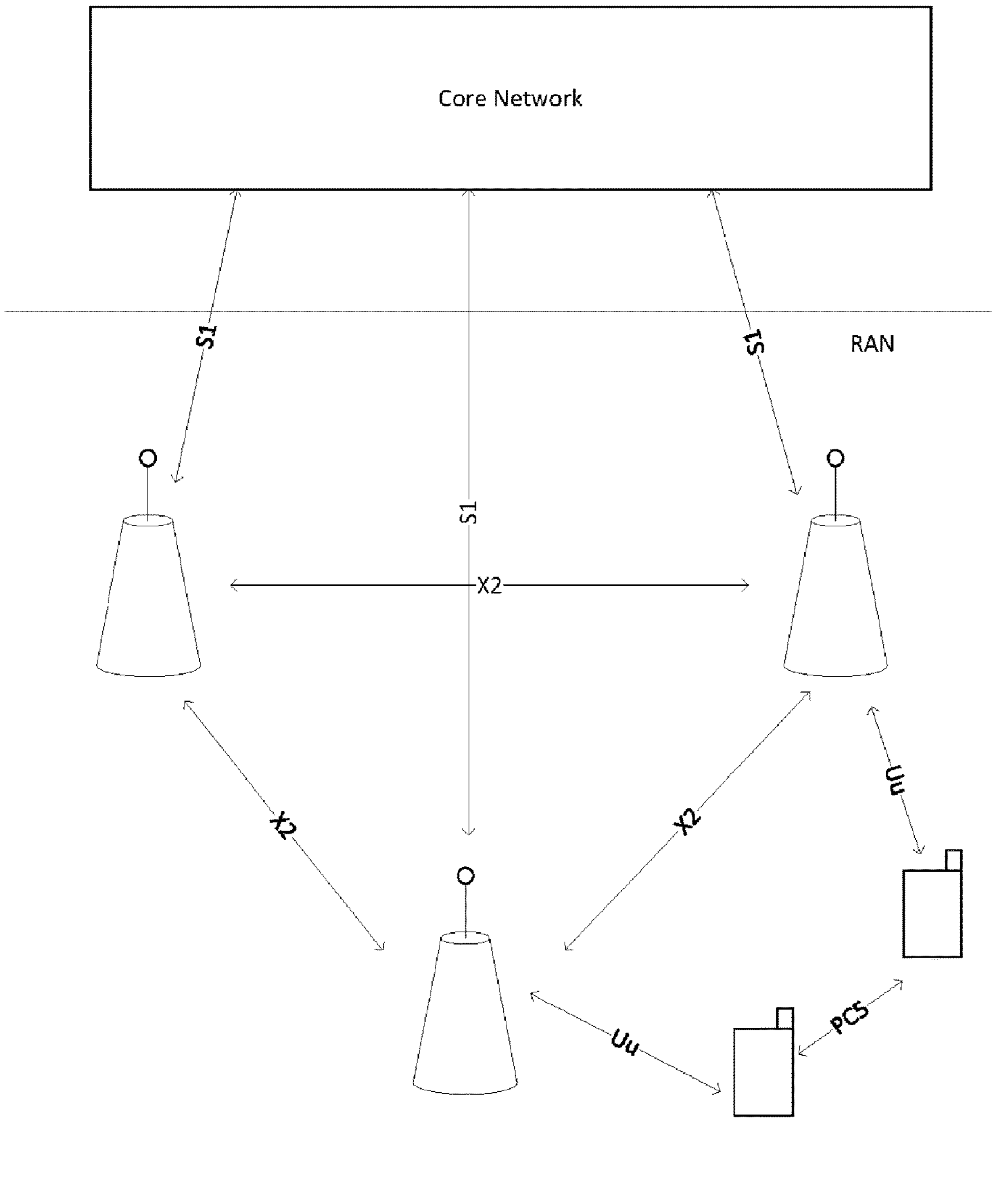
FIGS. 1 and 2 show schematic diagrams of selected elements of a cellular communications network.

FIG. 1 shows a schematic diagram of three base stations (for example, eNB or gNBs depending on the particular cellular standard and terminology) forming a cellular network. Typically, each of the base stations will be deployed by one cellular network operator to provide geographic coverage for UEs in the area. The base stations form a Radio Area Network (RAN). Each base station provides wireless coverage for UEs in its area or cell. The base stations are interconnected via the X2 interface and are connected to the core network via the S1 interface. As will be appreciated only basic details are shown for the purposes of exemplifying the key features of a cellular network. A PC5 interface is provided between UEs for SideLink (SL) communications. The interface and component names mentioned in relation to FIG. 1 are used for example only and different systems, operating to the same principles, may use different nomenclature.

The base stations each comprise hardware and software to implement the RAN's functionality, including communications with the core network and other base stations, carriage of control and data signals between the core network and UEs, and maintaining wireless communications with UEs associated with each base station. The core network comprises hardware and software to implement the network functionality, such as overall network management and control, and routing of calls and data.

Figure 2:
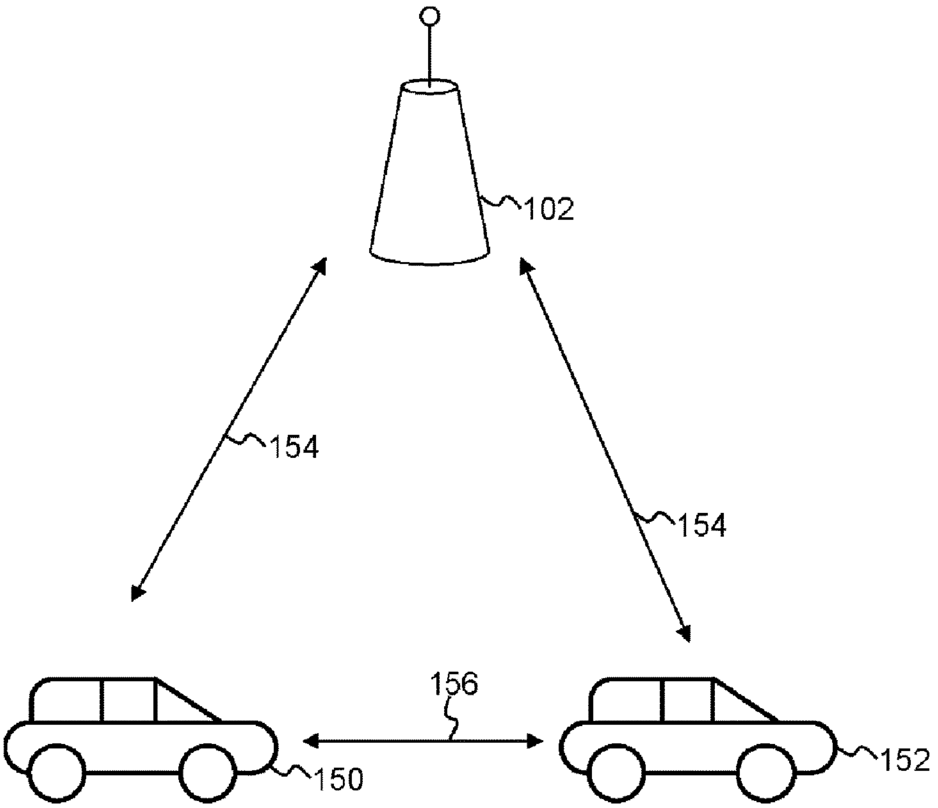

In addition to uplink/downlink communications between UEs and base stations, sidelink communications may also be implemented in which UEs communicate directly with each other. FIG. 2 illustrates a base station 102 forming a RAN, and a sidelink transmitter (SL Tx UE) UE 150 and a sidelink receiver (SL Rx UE) UE 152 in the RAN. UEs 150 and 152 are described as transmitter and receiver only for the purposes of explanation during a particular communication, and their roles may equally be reversed. The base station 102 is arranged to wirelessly communicate over respective connections 154 with each of the SL Tx UE 150 and the SL Rx UE 152. The SL Tx UE 150 and the SL Rx UE 152 are arranged to wirelessly communicate with each other over a sidelink 156.

Sidelink transmissions utilise TDD (half duplex) on either a dedicated carrier, or a shared carrier with conventional Uu transmissions between a base station and UE. Resource pools of transmission resources are utilised to manage resource and allocation and manage interference between potentially concurrent transmissions. A resource pool is a set of time-frequency resources from which resources for a transmission can be selected. UEs can be configured with multiple transmit and receive resource pools.

Two modes of operation are used for resource allocation for sidelink communication depending on whether the UEs are within coverage of a cellular network. In Mode 1, the V2X communication is operating in-coverage of the base stations (eg eNBs or gNBs). All the scheduling and the resource assignments may be made by the base stations.

Mode 2 applies when the sidelink services operate out-of-coverage of cellular base stations. Here the UEs need to schedule themselves. For fair utilization, sensing-based resource allocation of transmission resources is generally utilised by the UEs. It is expected that resource selection will comprise two steps. In a first step a UE will identify resources that are considered available for selection, and in a second step specific resources will be selected for a transmission. The first step may be conducted by starting with a set of all resources within a selection window and removing those which are not considered candidates (for example resources reserved by another UE with an SL-RSRP above a threshold). The step of selecting resources may be a random selection, potentially with constraints such as HARQ timing and delay between resources.

In Mode 2, UEs select transmission resources they wish to use for a transmission and transmit a Sidelink Control Information (SCI) message indicating those resources. The SCI notifies the recipient (which may be a single UE in unicast, a group of UEs in groupcast, or all reachable UEs in broadcast) of the details of the transmission it can expect.

Existing development of sidelink communications has focussed on "always-on" devices for which power consumption is not a significant concern. The following disclosure addresses power saving concerns which may become relevant when utilising sidelink communications with UEs with a limited power budget. In particular, methods and systems for the application of Discontinuous Reception (DRX) for sidelink communications are disclosed.

DRX enable UEs to reduce their power consumption by shutting down receive systems and waking up at defined intervals. In the RRC_IDLE and RRC_INACTIVE states a UE may sleep (i.e. shut down non-essential systems) and wake up once each paging cycle to listen for paging messages for the UE. In RRC_CONNECTED UEs apply a more complex scheme which may be more relevant for sidelink devices which are currently always on.

Figure 3:
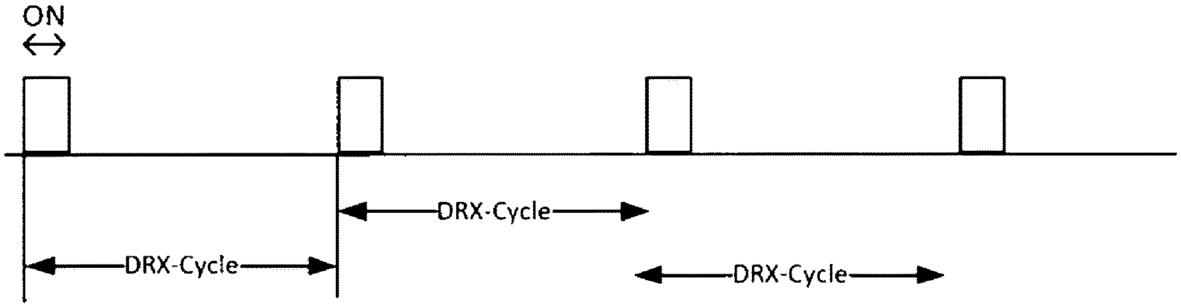
FIG. 3 shows a single DRX cycle.

FIG. 3 shows a basic DRX configuration in which a single (long) DRX Cycle is configured. The UE will attempt to receive scheduling and control commands (for example paging messages) during the on periods and shut down its receive elements during the rest of the DRX cycle.

Figure 4:
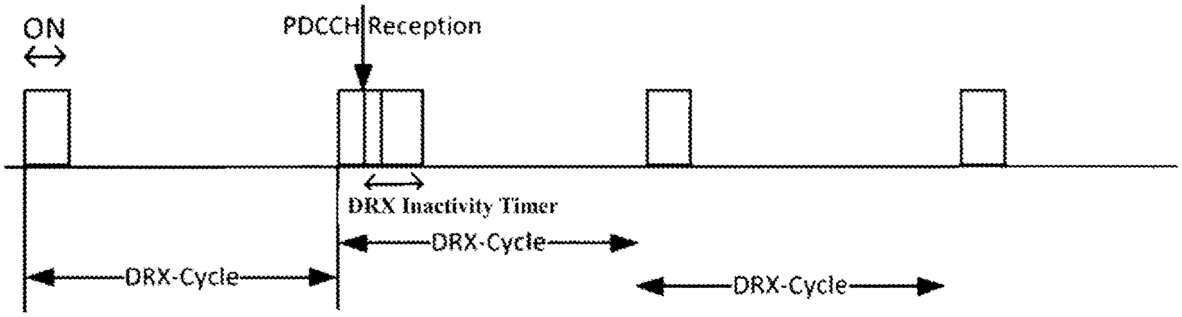
FIG. 4 shows extension of a DRX on period.

As shown in FIG. 4, if a UE receives a message from the relevant base station during a DRX on period it may extend the DRX on period depending on its configuration and the type of message received. For example, if the UE receives data from the base station, or transmits data to the base station, during a DRX on period the UE remains on to allow completion of the HARQ process for that data. The UE's behaviour is configured by the DRX configuration. FIG. 4 shows an example in which a UE is configured with one DRX cycle and during one of the DRX on periods it receives a message on PDCCH. Accordingly, the UE extends its DRX on period to complete processing of that message and any required actions.

Figure 5:
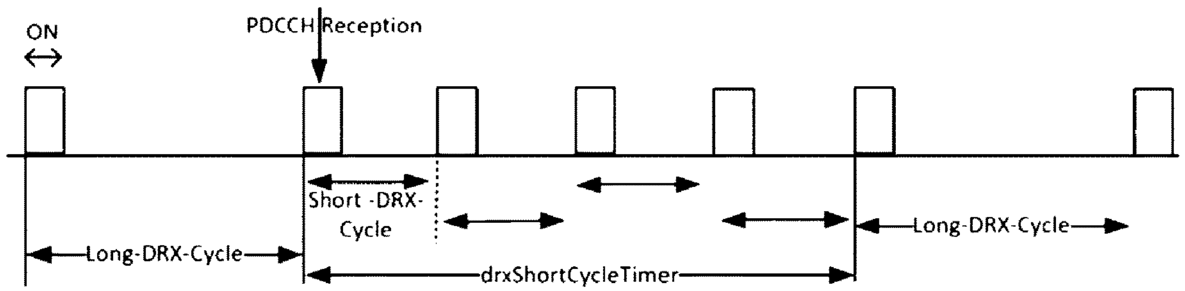
FIG. 5 shows short and long DRX cycles.

In the example of FIG. 5 a UE is configured with both long and short DRX cycles. The UE applies the long DRX cycle as discussed above, but upon reception of a message on PDCCH during the DRX on time it switches to the short DRX cycle such that it wakes up more frequently. The short DRX cycle is applied for a duration specified by drxShort-CycleTimer before switching back to the long DRX cycle. The additional wake-ups can be utilised by the UE to continue communications depending on the content of the message received on PDCCH.

Table 1 shows a set of parameters that may be utilised in DRX configuration:—

TABLE 1

| DRX Parameter | Description |
|---|---|
| DRX Cycle | The duration of one DRX on time and one off time (i.e. the DRX period). This value is not explicitly specified in RRC messages but derived from other parameters. |
| onDurationTimer | The duration of the DRX on time in one DRX cycle |
| drx-Inactivity timer | Specifies how long UE should remain on after the reception of a PDCCH. For the duration of this timer the UE remains on which may extend the on period into the period in which it is usually off. |
| drx-Retransmission timer | Specifies the maximum number of consecutive PDCCH subframes the UE should remain on to wait for an incoming retransmission after the first available retransmission time |
| shortDRX-Cycle | A DRX cycle which can be implemented within the off period of a long DRX Cycle. |
| drxShortCycleTimer | The consecutive number of subframes for which the short DRX cycle should be applied after the DRX Inactivity Timer has expired. |

A further parameter applicable to the DRX configuration is the DRX cycle start offset which defines the position in time of the DRX cycle. The DRX offset of different UEs defines the overlap between their respective DRX cycles. For example, the DRX on period of two UEs with the same DRX cycle but different DRX offsets would never overlap if the offset difference is larger than the on time and the UEs may not be able to communicate.

The application of DRX to sidelink communications is particularly challenging since there are a large number of possible communication paths and there may be no central coordination of the timing of transmissions (e.g. when operating in Mode 2). Particular issues to resolve include alignment of DRX on periods between sidelink UEs & how such devices communicate, how a DRX enabled UE and an always-on sidelink UE will communication, and DRX mechanisms for UEs operating in Mode 1 in coverage of a base station. Each of these aspects is addressed by parts of the following disclosure.

As a general introduction, the following disclosure proposes methods for DRX alignment among sidelink UEs. In one method, DRX configurations are aligned among the UEs by (pre-) configuration over the sidelink frequencies which enables communication between UEs without explicit DRX alignment, but this may result in traffic congestion over the aligned DRX on intervals. Another method is proposed where the DRX configurations are staggered in time among the sidelink UEs. In addition, it is disclosed to have multiple DRX configurations such that UEs can choose the suitable configuration for their QoS and energy saving requirements.

A hierarchical method of DRX configuration is disclosed where a common DRX configuration is made known to the devices and is used by all relevant UEs. The UEs may select a different DRX configuration, in addition to the common configuration, for different communication QoS requirements and/or groupcast communications.

Also, higher layer (RRC) messages are proposed through which sidelink UEs can exchange DRX configuration information with the network or with other sidelink UEs. To make the communication with a UE wishing to reduce power consumption more efficient, it is disclosed that a transmitting UE may request the use of a particular DRX configuration at a destination UE.

The term "sidelink UE" is used herein to describe a UE which is involved in, or is capable of, communications via a sidelink channel with at least one other sidelink UE.

Sidelink UEs are pre-configured with sidelink time-frequency resources for sidelink communication, so called sidelink Resource Pools (RPs), thereby defining candidate resources for reception (receive RPs) and transmission (transmit RPs). Sidelink bandwidth parts (BWPs) are defined as part of the sidelink frequency configuration. The Sidelink BWP comprises multiple transmit and receive RPs configured for each sidelink UE.

When sidelink UEs are operating in-coverage of a base station (Mode 1) the sidelink configuration can be updated by signalling between the base station and UE. However, when sidelink UEs are operating out of coverage (Mode 2) such an update is not possible and the system must be defined to accommodate out of coverage UEs.

Sidelink UEs can be enabled to operate with DRX functionality via their (pre-) configuration, with the functionality being enabled or disabled by signalling. The (pre-) configuration may also define the level and configuration of DRX each UE can employ. The configuration may be according to UE category or capability. The sets of DRX configuration parameters (on durations, DRX short cycles, DRX long cycles etc) are defined by standard or communicated to the relevant sidelink UEs, for example, all values of DRX parameters may be defined in the specification. Thus, such sets of parameters may be added to the higher layer (RRC) specifications and sidelink UEs will store them in their local memory.

In a first example, sidelink UEs may be (pre-) configured with one or more DRX configuration and the relevant parameters (DRX long cycle, DRX short cycle, ON duration, inactivity timers etc) for the configuration (s).

If only a single DRX configuration is defined for a sidelink UE the UE may use that configuration for DRX over the active BWP for the sidelink UE. Where more than one DRX configuration is defined in the (pre-) configuration one configuration may be specified as the default configuration either implicitly or explicitly. For example, the first defined configuration may be assumed to be the default which is selected if no particular configuration is specified.

The (pre-) configuration of multiple DRX configurations may enable sidelink UEs to select the most appropriate configuration depending on power saving and communication requirements which may change over time. For example, if a sidelink UE's battery is running low a DRX configuration with a longer DRX cycle, or shorter DRX on duration, may be selected to preserve battery life, although this may lead to a decrease in communication quality. On the converse, if a UE has urgent traffic the UE may be removed from DRX or select a shorter DRX period.

In summary, a UE may be (pre-) configured with one or more DRX configurations and the UE or network may select one of those configurations for use. The DRX configuration to utilise may be indicated to the UE via higher layer signalling from a base station to the UE.

Sidelink UEs may be configured with multiple sidelink BWPs in which case the BWP configuration may include a DRX configuration. That is, sidelink BWPs may be associated with different sets of sidelink DRX configurations, for example by defining an association between sidelink BWP IDs and DRX configurations. Alternatively, the DRX configuration IDs relevant for each sidelink BWP configuration may be indicated within the sidelink BWP configuration.

It is possible for different BWPs to be defined for the same or different carriers, and the carriers can be dedicated or shared sidelink carriers. Shared carriers may be shared with other sidelink channels, the Uu interface, or other services. Different BWPs may have different time-frequency resources with different periodicities and availabilities. One or more BWP-specific DRX configurations may therefore be defined to allow suitable DRX configurations to be defined which take into account the nature of underlying resource over which a given sidelink BWP is configured.

In a different approach, each resource pool can be configured with a DRX configuration. All the UEs operating over that resource pool may employ that DRX configuration if they need to save power.

As noted above, when sidelink UEs are operating in-coverage of a base station (Mode 1) the base station schedules resources for sidelink transmissions, and when a UE is operating out of coverage the UEs can select their own resources such that there is no central coordination of resource selection. UEs operating in Mode 2 therefore need to be able to communicate not only to exchange messages, but also to arrange scheduling of those transmissions. This may be particularly challenging for devices operating in DRX such that their receiver is only active for short DRX on periods.

If two sidelink UEs have offset DRX cycles, with the same period, their respective DRX on periods will not fully overlap and may be completely non-overlapping. These UEs may not be able to communicate since they are turned on at different times. The UEs may therefore need to exchange information on their DRX cycles so that UEs are aware of when other sidelink UEs will be turned on and will receive messages sent to them. Methods for coordinating DRX cycles to enable efficient communication between UEs operating in DRX are set out below.

In order to allow communication between sidelink UEs in DRX mode the DRX cycles may be aligned such the DRX on periods occur at the same time for all sidelink UEs operating on a particular sidelink carrier. This common DRX configuration may be configured as part of the UE sidelink configuration or may be a BWP-specific DRX configuration. BWPs are defined for each UE and hence the BWP identities may be UE-specific. However, corresponding BWPs are communicating over the same/related time-frequency resources (Resource Pools) over a particular carrier for their geographic zone. The DRX configurations for corresponding BWPs should therefore be known by each UE using the BWP and aligned. Alignment of DRX configuration for different UEs may be implemented by specifying a DRX start time for the DRX configuration. The DRX on period for each UE with the same DRX configuration will thus align with all other UEs using that DRX configuration, whether in Mode 1 or Mode 2. Each UE can thus determine the DRX period for each UE from the sidelink transmission frequency.

A common start time can be defined for all DRX configurations when multiple DRX configurations are available. When there are DRX cycles of different lengths and periodicities, suitable timing offsets may be configured to allow overlap between different configurations to enable the communication among the UEs. Varying the configuration may change the overlap and alignment between different UEs, but each UE will have awareness of other DRX on periods and so can align transmissions to those periods. All UEs operating on a certain BWP or carrier will have their DRX on period at the same time and hence can communicate with other in that period, and with other non-DRX UEs. Such an arrangement may be particularly attractive for groupcast and broadcast sidelink communications as all UEs can be reached during the same period. Groupcast and broadcast transmissions can thus be made using the frequency-specific DRX on timings which will ensure alignment with all other UEs and removes the need for an explicit alignment of DRX cycles.

If UEs can select from multiple DRX configurations the UEs may indicate to other UEs the configuration being utilised such that each UE is aware of the DRX on period for other relevant UEs with which it may wish to communicate. When a UE is operating in Mode 2 it may select an appropriate DRX configuration based on its QoS requirements and power constraints. When operating in Mode 1 the DRX configuration may be selected by the base station from the configurations available for the relevant frequency and may indicate the configuration to the UE.

When operating in Mode 1 UEs can transmit their DRX configuration preference to the base station which can use that preference when selecting a configuration for the UE, for example based on its power status. A sidelink UE may thus send desired DRX configuration parameters, e.g., DRX long cycle duration, DRX short cycle duration, inactivity timer (s), and DRX ON duration as part of a DRX preference indication to the base station. The base station may then select the DRX configuration for the UE based on the preference indication and communicate the DRX configuration to the UE. If a set of multiple DRX configurations are defined for the UE the sidelink UE can indicate its preference by indicating the DRX configuration it would prefer from the available DRX configurations. The base station may select the configuration and parameters indicated by the UE or may select a different configuration if deemed more appropriate for the UE and overall network performance. The base station may indicate the selected DRX confirmation and/or parameters using an RRC message, for example in an RRC (re-) configuration message.

Sidelink UEs may provide their DRX preferences to the base station using RRC messaging while in the RRC_CONNECTED state over the Uu interface. The preference may be transmitted in response to certain events, or if its preference changes. For example, as the UE's available power supply reduces the DRX preference may change to enable greater power saving. Alternatively a need for efficient communication with another sidelink UE may arise triggering a preference for a different DRX configuration to facilitate that.

The DRX configuration preference may be associated with a particular sidelink BWP such that the sidelink UE indicates its DRX preference for a particular BWP. Alternatively, the DRX configuration preference may apply to all BWPs available for a sidelink UE since the principles for preferring a particular configuration are likely to apply to all BWPs for the UE (e.g. a need to reduce power consumption).

The transmission of DRX preference may be provided as part of the UE assistance procedure which utilises higher layer (RRC) signalling. For example, the preference may be indicated in the "UEAssistanceInformation" RRC message.

As set out above, aligned DRX cycles for UEs on a particular sidelink frequency simplifies communication and coordination between UEs. However, a disadvantage may be that transmissions are concentrated in the DRX on intervals which may lead to congestion over that time period. To avoid this congestion the DRX cycles of different UEs may be offset such that the DRX on periods occur spread over a range of times. This may be achieved by defining a DRX time offset as part of the DRX (pre-) configuration. Each sidelink UE is thus aware of its DRX offset and can indicate that to other sidelink UE with which it may wish to communicate.

The offset applied to each UE may be dependent on a device parameter such as the device identity. The sidelink UEs may receive the allowed configurations as part of the sidelink configuration, which may be device or BWP specific as discussed above. The DRX configuration may include an offset value, or a list of possible offsets which are permitted. Device-specific DRX offsets can be determined at each sidelink UE using the defined relationship between the relevant parameter and available offsets. The offset may be based on DRX configured parameters and UE-specific parameter (s) to randomise the DRX on period amongst a group of UEs. For example, the sidelink destination or source identity may be used to select an offset for a UE from a list of configured available offsets. The relationship of the parameter to the offset may be defined in any appropriate way, for example using an equation including operators such as a floor/ceiling operation, or modulo. The use of a device-specific offset should lead to a distribution of the DRX on periods over time, even though all devices have the same DRX on period and cycle period. The even distribution of DRX offsets leads to a distribution of traffic over time and should reduce channel congestion at certain points in time.

The definition of DRX offset based on parameters avoids the need to communicate explicit indications of DRX configurations between sidelink UEs since each UE can determine the offset that will apply at other UEs based on the relevant parameters and defined relationship.

For groupcast and broadcast communications an identifier that is common to the UEs involved may be utilised to define the offset such that all UEs in the group/broadcast use the same offset. For example, the offset may be dependent on the identity of the group to which a transmission is to made. The use of a common parameter and relationship avoids the need for processes to identify a common DRX cycle and parameters that are suitable for all relevant UEs. During the group setup phase each UE selects its DRX configuration based on the group-specific DRX configuration & parameters. For broadcast communication, the UEs may choose a configuration which uses the cast type (broadcast) parameter or a DRX configuration which is common over the transmission resource pool so that all the UEs in DRX mode may be able to receive that communication.

If the DRX configuration is based on the UE identity it is possible for a UE to have multiple active DRX configurations. For example, if a UE has active unicast and groupcast communications each may have a different assigned DRX configuration based on its identity in each communication. This may increase the on time for the UE compared to the case of single configuration.

For sidelink broadcast transmissions the cast type field in the second stage sidelink control information (SCI) message may be associated with a DRX configuration. UEs receiving the broadcast transmission may thus adopt that DRX configuration and hence are able to receive future related broadcast messages made in alignment with the indicated DRX cycle. Each UE is thus aware of the DRX on period and hence can align its broadcast transmissions with that period to ensure they are received by relevant sidelink UEs in the vicinity of the transmitting UE.

Figure 6:
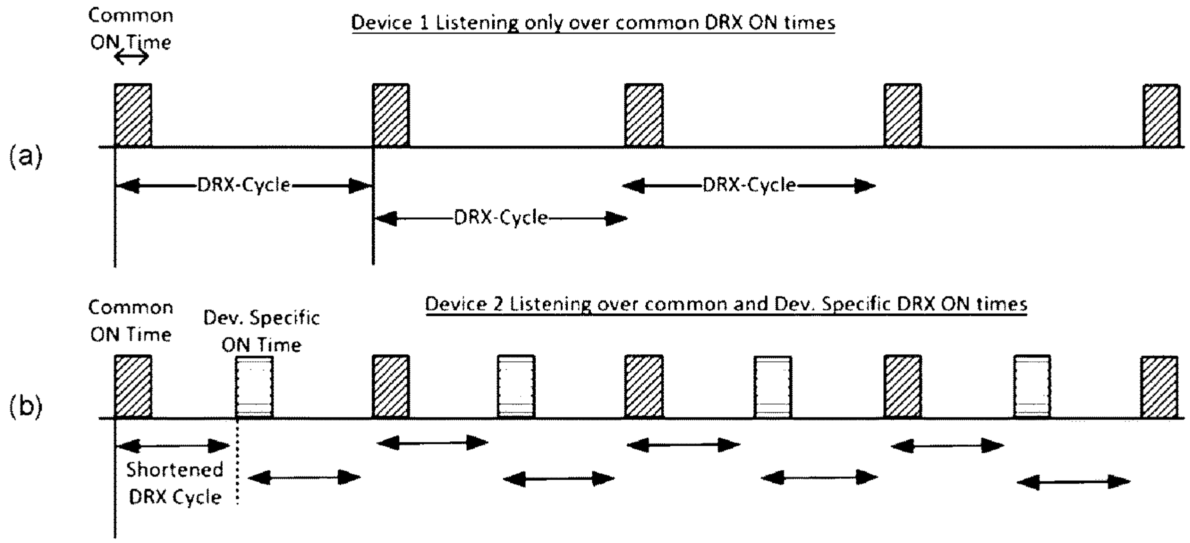
FIG. 6 shows an example of common and device-specific DRX cycles.

FIG. 6 shows an example of a DRX configuration in which a hierarchy of configurations are defined in an effort to avoid congestion in a single aligned DRX on interval. A first set of DRX on times are common to all sidelink UEs for a particular sidelink frequency configuration (BWP), and a second part of DRX on times that are device-specific. All relevant sidelink UEs (Devices 1 and 2 in this example) are active in the first set of DRX on times such that communications are possible between them without any need to explicitly indicate DRX cycles. Sidelink UEs (Device 2 in this example) without significant power saving concerns can also apply the second set of DRX on times such that they have more opportunities to receive and transmit communications. As shown in FIG. 6 (*b*) the use of both the first and second sets of DRX on times effectively shortens the DRX cycle time. All UEs will thus be reachable during the first set of DRX on periods, and UEs may also be reachable during the second set of on periods. FIG. 6 shows two DRX cycles, but more may be defined.

In order to configure a set of hierarchical DRX cycles the longest DRX cycle (with DRX offset as appropriate) may be specified as the common DRX cycle. One or more device-specific DRX cycles may then be defined which UEs may use in addition to the common DRX cycle. In a particular example the device-specific DRX configurations may be defined as an integer division of the common DRX cycle period. In this approach, multiple DRX configurations are derived from the common DRX configuration. Thus additional configurations have the same offsets but shorter DRX cycles. Alternatively, the DRX cycles may be independently defined as a common DRX configuration, and one or more device-specific configurations. In this approach, all the devices even in power saving mode will at least listen to the common DRX configuration. The additional configurations are independently defined with their DRX cycles and associated offsets for use in addition to the common DRX configuration.

As described above for the DRX configuration, UEs in Mode 2 may select their preferred DRX configurations, and in Mode 1 the base station may select the DRX configuration and transmit it to the UE, potentially based on a preference transmitted from the UE to the base station.

A set of device-specific DRX configurations may be configured and each UE can select the appropriate configuration for it. The selection of configuration may be performed as described above, for example based on a parameter of the UE, or derived using a known formula. The selection of additional DRX configurations, above the common one, may be based on the QoS target for active communications of the UE.

The common DRX on periods may be used to start communications between UEs when at least one UEs has DRX enabled. Once the UEs have established communications they can exchange DRX cycle information and align on periods to allow further communications. UEs may be permitted to update or modify device-specific DRX configurations to align with other UEs to facilitate communications. The sharing of information may be achieved utilising sidelink RRC sidelink messages. The preferred parameters may be communicated to the base station in Mode 1, or to other sidelink UEs in Mode 2.

In conjunction with the definition and selection of DRX configurations for sidelink communications as set out above, the base station can also select DRX configurations for sidelink and Uu interface such that the DRX on periods for the two interfaces overlap. UE power consumption may be reduced by a complete alignment between DRX on periods for sidelink and Uu interfaces but this may not be practical in practice. The sidelink carrier may use a dedicated sidelink frequency or may that frequency may be shared with the Uu interface. When the carrier is shared the sidelink and Uu interfaces may be operating in a time multiplexed manner such that only one of the interfaces is active at a time. Furthermore, the configuration of RPs and the number of RPs in a particular geographic zone may mean it is not possible to perfectly align the DRX on periods between the sidelink and Uu interfaces. However, even partial overlap can provide significant power saving advantages. The base station may select an appropriate configuration which achieves sufficient overlap within the constraints of the overall system configuration. As the overlap increases, generally the power saving will also increase.

The DRX configuration and parameters for the Uu and sidelink interfaces are selected and communicated to the UE when defining the configuration for in-coverage (Mode 1) sidelink UEs.

As set out above when at least one sidelink UE in a communicating pair is in DRX mode it will only be listening for sidelink communications during its on period, potentially requiring alignment of DRX cycles between communicating UEs for communication to be efficient. Each UE should know the DRX configuration of the other UE in order to be able to align transmissions with the DRX period. As set out above the DRX on periods may be aligned by design, or staggered and known by configuration, but the available on periods may not be suitable for all required QoS for sidelink communications. Sidelink UEs should be able to communicate and select DRX configurations to enable them to provide the required QoS for communications.

Figure 7:
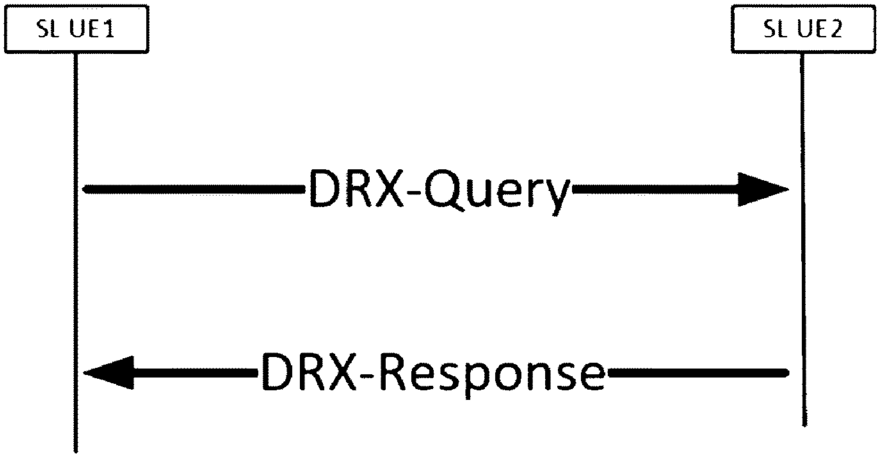
FIGS. 7 to 9 show examples of higher layer messages for DRX configuration.

FIG. 7 shows an example communication exchange for two sidelink UEs managing DRX configurations and setup. The messages may be sidelink RRC messages. A first sidelink UE can send a query to a second sidelink UE with which it intends to communicate to request DRX configuration information, and the second sidelink UE can respond with details of its DRX configuration. For example, the response may include details of the DRX cycle such as long, short, or both, and the applicable parameter values. In accordance with FIG. 7, UEs can request and receive DRX configuration and parameters using higher layer messages, which may be termed DRX query and response messages.

DRX query and DRX response messages can be combined with other UE coordination relevant information. For example, a general sidelink coordination RRC message can be defined comprising all relevant DRX parameters. The relevant UEs can exchange the coordination message to share their DRX configuration and active parameter values with other sidelink UEs. DRX information may be shared by UEs proactively without an explicit query or request for that information. For example, when UEs are exchanging higher layer (RRC) (re-) configuration messages the DRX information may be included.

Where only a single DRX is available for a pair of UEs, or if all parameters are known to the UEs, it may only be necessary to communicate whether a UE is in DRX or not, with the receiving UE calculating the required parameters or being aware of the configuration. This may reduce the amount of information that needs to be exchanged to enable two UEs in DRX mode to communicate. When UEs are establishing an RRC connection they can exchange their DRX status, and each devices uses that information to communicate according to the determined DRX on period.

In a set of sidelink UEs, knowledge of one UE's DRX configuration may be sufficient to enable communication between all of the UEs as each other UE can align their transmissions with the DRX cycle of that one UE. However, this may not accommodate all situations, such as when two UEs are in DRX mode and their DRX on periods do not overlap, where the DRX on period becomes congested, or the DRX configuration does not support the QoS or other parameter required for a particular communication. The sidelink UEs must thus align at least part of their DRX on periods and then to exchange their DRX preferences for configuration and parameter values in a comparable process to that discussed above for communication preferences to a base station. The sidelink UEs can then select a DRX configuration that is acceptable to all UEs.

Figure 8:
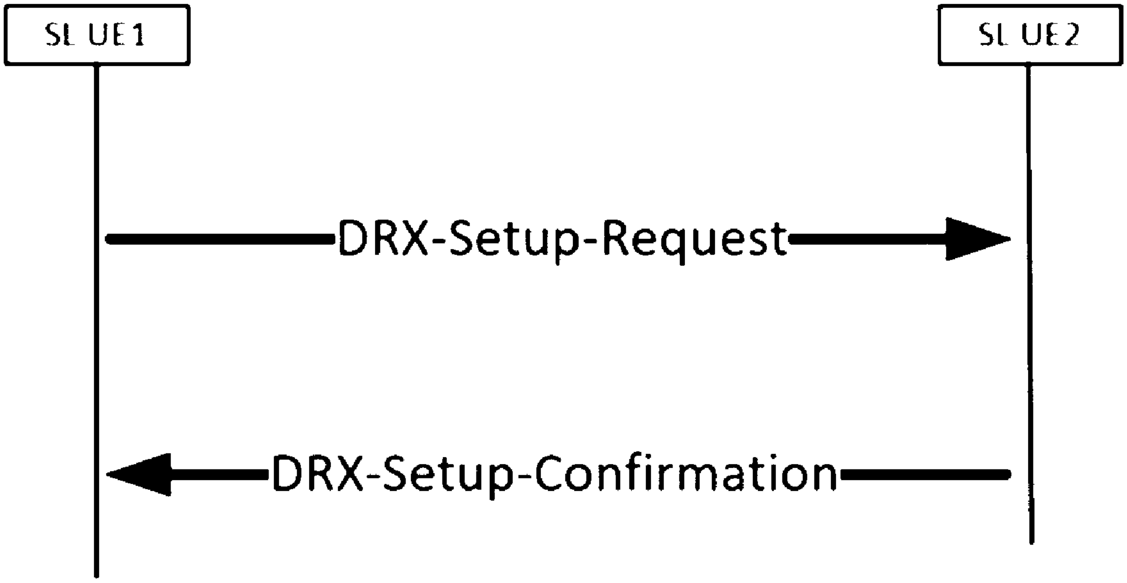
Figure 9:
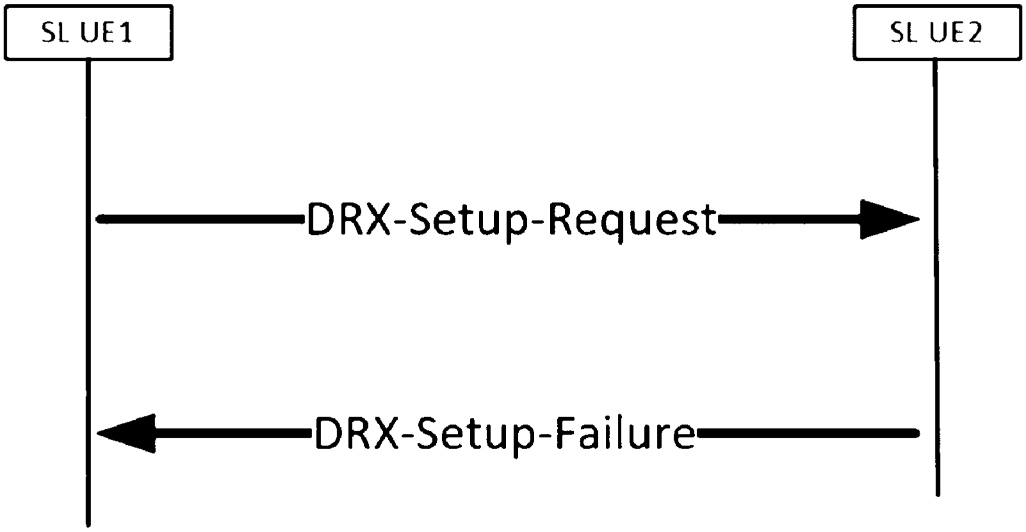

FIG. 8 shows a message exchange in which a transmitting sidelink UE can request a DRX configuration for its intended destination UE. The transmitting UE identifies a DRX configuration that it considers appropriate for the QoS of the transmission, and optionally DRX preferences received from the destination UE, and transmits that as a request to the destination UE. In FIG. 8, SL UE1 intends to transmit data to SL UE2 and so transmits a DRX setup request message to SL UE2 indicating the preferred DRX configuration for the transmitting UE. The receiving UE, SL UE2, may update its DRX configuration according to the request and reply with a setup confirmation message. If the DRX configuration cannot be used by SL UE2 it may not adopt the configuration and replies with a DRX setup failure message as shown in FIG. 9. After a failure message the transmitter UE may transmit a different request, or adapt its transmissions according to the receiver UE's active DRX configuration.

DRX setup request can indicate preferred DRX configuration from the perspective of SL transmitting device. It can also take into account the power saving requirement of the destination device, potentially known from the destination device capability/category. Depending upon the sidelink configuration, the receiving device, SL UE2, can update its DRX configuration as per the setup request and reply with a DRX Setup Confirmation message. If it fails to comply with the DRX Setup Request, it can send a DRX Setup Failure message DRX setup failure may indicate that the other device is unable to setup the requested DRX configuration. Then the transmitting device may either make a different request or make the transmissions such that receivable by the destination device active configuration.

A specific use-case of sidelink communications is for so-called "vulnerable UEs". Such UEs should be synchronised with UEs in their vicinity either in Mode 1 or Mode 2, particularly for collision-avoidance uses. In this case the closer other sidelink UEs (for example cars) to the vulnerable UE, the lower the expected latency and a rapid response is expected for synchronisation.

To accommodate this scenario the DRX configuration of the vulnerable UE should be known promptly to other UEs proximate to the vulnerable UE. To achieve this the DRX configuration applied by a UE may be based on geographic location. That is, an association is defined by a DRX configuration and a geographic parameter such as the Zone ID of the UE. Each UE can calculate its zone ID from configured parameters and geographic location. In a simple example, a single DRX configuration may be associated to a single zone ID, thereby ensuring all UEs in the zone have aligned DRX on periods and will receive transmissions at that known time. In more complex, but more flexible, approaches multiple DRX configurations can be associated with each zone ID, with UEs selecting a configuration using a device ID or other method (for example as discussed hereinbefore).

Alternatively, UEs may broadcast their DRX configuration, for example using broadcast messages. UEs within reception range of the UE will thus receive the DRX configuration and can align their transmissions with the indicated DRX on periods. If in a given area, multiple UEs are broadcasting their DRX configuration, it may be necessary to unify groups having different DRX configurations. For example, the identified group with the largest number of members can be defined as the active DRX configuration and smaller groups will change their DRX configuration to adopt that of the largest group.

Although not shown in detail any of the devices or apparatus that form part of the network may include at least a processor, a storage unit and a communications interface, wherein the processor unit, storage unit, and communications interface are configured to perform the method of any aspect of the present invention. Further options and choices are described below.

The signal processing functionality of the embodiments of the invention especially the gNB and the UE may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD)® read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally 45 referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory. In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices.

Thus, the elements and components of an embodiment of the invention may be physically, functionally and logically implemented in any suitable way. Indeed, the functionality may be implemented in a single unit, in a plurality of units or as part of other functional units. Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' or "including" does not exclude the presence of other elements.

What is claimed is:

1. A method of configuring a UE operating in a cellular communications system for discontinuous reception, the method comprising the steps of receiving, by a UE, a plurality of discontinuous reception configurations from a base station for sidelink communication, wherein one of the plurality of discontinuous reception configurations is defined as a default configuration;

selecting, by the UE, at least one of the discontinuous reception configurations for performing discontinuous reception operation with another UE over sidelink; and operating the UE according to the at least one selected discontinuous reception configuration for sidelink communication.

2. The method according to claim 1, wherein the step of selecting is performed by the UE.

3. The method according to claim 1, wherein the discontinuous reception configuration is selected based on a cast type active for the UE.

4. The method according to claim 1, wherein the discontinuous reception configuration is selected based on a characteristic of the UE.

5. The method according to claim 4, wherein the characteristic is a communication requirement of the UE.

6. The method according to claim 5, wherein the communication requirement is an urgency of data for transmission, or a quality of service parameter.

7. The method according to claim 1, wherein the plurality of discontinuous reception configurations each define at least one of following parameters: an on duration, a DRX cycle time, a DRX short cycle time, a DRX long cycle time, and an offset.

8. The method according to claim 1, wherein the discontinuous reception configurations are communicated to the UE utilising RRC signalling, or are defined by a standard.

9. A cellular communication system comprising a base station and at least UE configured to perform steps of configuring a plurality of discontinuous reception configurations form the base station for sidelink communication at the UE, wherein one of the plurality of discontinuous reception configurations is defined as a default configuration;

selecting at least one of the discontinuous reception configurations for use by the UE to perform discontinuous reception operation with another UE over sidelink; and operating the UE according to the at least one selected discontinuous reception configuration for sidelink communication.

10. The cellular communication system according to claim 9, wherein the step of selecting is performed by the UE.

11. The cellular communication system according to claim 9, wherein the discontinuous reception configuration is selected based on a cast type active for the UE.

12. The cellular communication system according to claim 9, wherein the discontinuous reception configuration is selected based on a characteristic of the UE.

13. The cellular communication system according to claim 12, wherein the characteristic is a communication requirement of the UE.

14. The cellular communication system according to claim 13, wherein the communication requirement is an urgency of data for transmission, or a quality of service parameter.

15. The cellular communication system according to claim 9, wherein the plurality of discontinuous reception configurations each define at least one of following parameters: an on duration, a DRX cycle time, a DRX short cycle time, a DRX long cycle time and an offset.

16. The cellular communication system according to claim 9, wherein the discontinuous reception configurations are communicated to the UE utilising RRC signalling, or are defined by a standard.

17. A UE configured to perform steps of receiving, by a UE, a plurality of discontinuous reception configurations from a base station for sidelink communication, wherein one of the plurality of discontinuous reception configurations is defined as a default configuration;

selecting, by the UE, at least one of the discontinuous reception configurations for performing discontinuous reception operation with another UE over sidelink; and operating the UE according to the at least one selected discontinuous reception configuration for sidelink communication.

18. The UE according to claim 17, wherein the step of selecting is performed by the UE.

* * * * *